(12) United States Patent
Chen et al.

(10) Patent No.: US 11,293,803 B2
(45) Date of Patent: *Apr. 5, 2022

(54) COMA-ELIMINATION BROADBAND HIGH-RESOLUTION SPECTROGRAPH

(71) Applicant: Fudan University, Shanghai (CN)

(72) Inventors: Liangyao Chen, Shanghai (CN); Songyou Wang, Shanghai (CN); Haibin Zhao, Shanghai (CN); Yuxiang Zheng, Shanghai (CN); Rongjun Zhang, Shanghai (CN); Yuemei Yang, Shanghai (CN); Jianke Chen, Shanghai (CN); Anqing Jiang, Shanghai (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/932,870

(22) Filed: Jul. 20, 2020

(65) Prior Publication Data

US 2020/0348174 A1 Nov. 5, 2020

(30) Foreign Application Priority Data

Dec. 18, 2019 (CN) .......................... 201911310162.4

(51) Int. Cl.
*G01J 3/18* (2006.01)
*G01J 3/02* (2006.01)
*G01J 3/04* (2006.01)
*G01J 3/28* (2006.01)

(52) U.S. Cl.
CPC ........... *G01J 3/1804* (2013.01); *G01J 3/0208* (2013.01); *G01J 3/04* (2013.01); *G01J 3/2803* (2013.01); *G01J 3/2823* (2013.01)

(58) Field of Classification Search
CPC .... G01J 2003/1273; G01J 3/0208; G01J 3/04; G01J 3/18; G01J 3/1804; G01J 3/2803; G01J 3/2823
See application file for complete search history.

(56) References Cited

U.S. PATENT DOCUMENTS

2016/0320237 A1* 11/2016 Ni .............................. G01J 3/18

OTHER PUBLICATIONS

Jiang et al. "Ultrahigh-resolution spectrometer based on 19 integrated gratings", Scientific Reports (2019) 9:10211, pp. 1-7 (Year: 2019).*

* cited by examiner

*Primary Examiner* — Hina F Ayub

(57) ABSTRACT

The present invention discloses a coma-elimination broadband high-resolution spectrograph, comprising incident slits, a collimating mirror, an integrated grating, a two-dimensional focus imaging mirror and a two-dimensional area array detector, wherein the incident slits enters along the incident slits, passes through a light through hole in the center of the integrated grating and is incident to the collimating mirror, the incident light enters the integrated grating along a coaxial optical path L1 after collimation of the collimating mirror and is focused by the two-dimensional focus imaging mirror after diffraction of each sub-grating, diffraction light in full spectrum region enters a focal plane of the two-dimensional area array detector for detection along an coaxial optical path L2, and off-axis angles of the L1 and the L2 are zero.

6 Claims, 1 Drawing Sheet

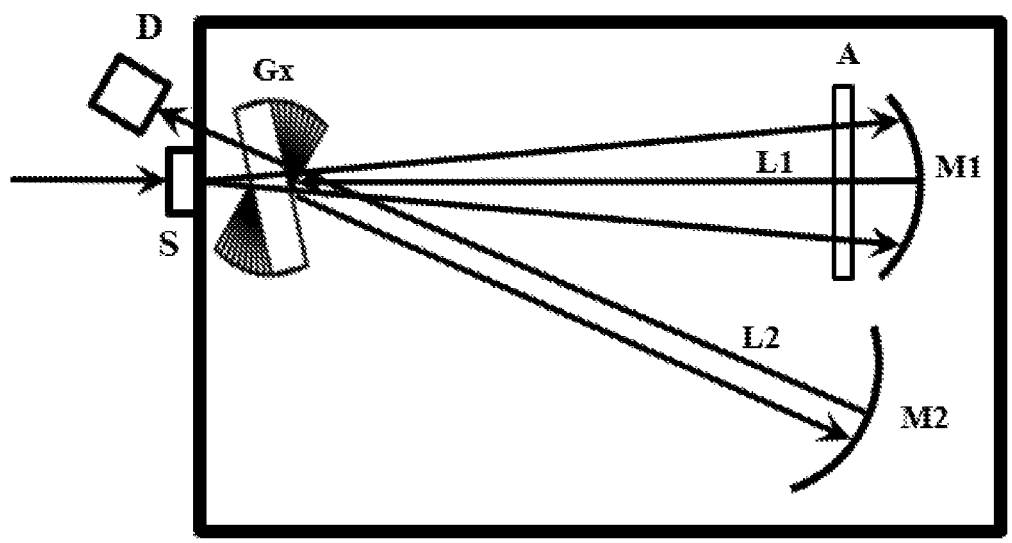

COMA-ELIMINATION BROADBAND HIGH-RESOLUTION SPECTROGRAPH

TECHNICAL FIELD

The present invention belongs to the technical field of optical electronic devices, and particularly relates to a multichannel broadband high-resolution spectrograph.

BACKGROUND

Spectrographs are also called spectrometers, and direct reading spectrometers are widely known. A device adopting a photodetector such as a photomultiplier to measure intensity of different wavelength positions of a spectrum line consists of an incident slit, a dispersion system, an imaging system and one or more exit slits. A required wavelength or wavelength region is separated out from electromagnetic radiation of a radiation source by a dispersion element, and intensity measurement is carried out on the selected wavelength (or a certain band is scanned). Two types of a monochromator and a polychromator are classified.

The monochromator is a photon energy and wavelength selector, is a basic spectrum analysis and measurement instrument and widely applied to the field of optics and photoelectron, and a grating monochromator is the most widely applied. According to a principle of grating diffraction:

$$d \sin \theta_m = m\lambda + g_o$$

In the formula, d is a groove pitch of the grating, $\theta_m$ is a distribution angle of an m(th)-order photon with a wavelength being $\lambda$ in space, $g_o$ is a constant correlated to the design of an optical system, and when m=1, the first-order high-efficiency diffraction photon with the corresponding wavelength may be obtained at different $\theta$ angle positions.

In the design of a traditional grating monochromator, the positions of incident slits and exit slits are fixed, and a mechanical transmission device is adopted to control $\theta$ angle of the grating to rotate so as to scan wavelengths.

The main characteristics of the grating monochromator employing the structure are as follows:

1. An optical collimating system is adopted to collimate and convert incident light to become parallel light incident to a grating;
2. A mechanical structure is adopted to rotate an azimuth angle of the grating to achieve scanning of wavelengths; and
3. An optical focusing system is adopted to focus diffraction light with different wavelengths from the grating and gather the diffraction light on a focal plane of the detector, thereby carrying out high-resolution detection and analysis on rich spectroscopy.

In the functional characteristics, an off-axis optical path, widely applied to a conventional spectrum analyzer, is adopted in collation of the optical path and detection and analysis of the diffraction light due to limitation of an optical structure. The main defect of the off-axis optical path is that optical deficiency such as coma difficult to overcome may be generated. Although research has been made on factors causing optical coma and how to overcome influence in principle and experiment, the influence is not fundamentally eliminated. Coma errors at limited wavelength positions may be reduced by a particular optical design, while coma influence of all wavelengths may not be eliminated, or light intensity reduction must be paid for the purpose, which is not beneficial for research and application of a high-performance spectrograph.

SUMMARY

The objective of the present invention: aiming at the defect of the prior art, the objective of the present invention provides a coma-elimination broadband high-resolution spectrograph without any mechanical transmission mechanism.

The technical scheme: the coma-elimination broadband high-resolution spectrograph according to the present invention comprises incident slits, a collimating mirror, an integrated grating, a two-dimensional focus imaging mirror and a two-dimensional area array detector;

the integrated grating consists of a plurality of sub-gratings, each sub-grating is disposed along a y direction perpendicular to an incident surface, each sub-grating has the same diffraction angle range along an x direction in which diffraction wavelengths are distributed in the incident surface, a light through hole is formed in the center of the integrated grating; and incident light enters along the incident slits, passes through the light through hole in the center of the integrated grating and is incident to the collimating mirror, the incident light enters the integrated grating along a coaxial optical path L1 after collimation of the collimating mirror and is focused by the two-dimensional focus imaging mirror after diffraction of each sub-grating of the integrated grating, diffraction light of a full-spectrum region enters a focal plane of the two-dimensional area array detector for detection along a coaxial optical path L2, and off-axis angles of the L1 and the L2 are zero.

A further optimal technical scheme of the present invention is that the total number of sub-gratings forming the integrated grating is n, n depends on $\lambda$ of total broadband spectrum regions and widths $\Delta\lambda_k$ of sub wavelength regions, i.e., $n=\lambda/\Delta\lambda$, and each grating corresponds to one of the sub wavelength regions.

Optionally, a diffraction angle of each sub-grating along an x direction in which diffraction wavelengths are distributed in an incident plane is $\Delta\theta$, i.e., $$\Delta\theta_1(\Delta\lambda_1)=\Delta\theta_2(\Delta\lambda_2)=\ldots=\Delta\theta_k(\Delta\theta_n) \quad (1)$$

In the formula:

$$\Delta\theta_1=\theta_2-\theta_1, \Delta\theta_2=\theta_3-\theta_2, \ldots \Delta\theta_k=\theta_{k+1}-\theta_k \quad (2)$$

$$\Delta\lambda_1=\lambda_2-\lambda_1, \Delta\lambda_2=\lambda_3-\lambda_2, \ldots \Delta\lambda_k=\lambda_{k+1}-\lambda_k \quad (3)$$

Optionally, the collimating mirror is a spherical mirror.

Optionally, the two-dimensional focus imaging mirror is a bifocal tire reflecting mirror or a coma-elimination bifocal lens, the focal length along an L1 direction is f1 and along an L2 direction is f2, and diffraction light from a multichannel integrated grating is focused on a focal plane of a two-dimensional area array detector.

Optionally, a color filter is further disposed between the collimating mirror and an integrated grating and used for filtering high-order diffraction light.

Beneficial effects: a coaxial optical system along incident and diffraction directions is adopted in the present invention to thoroughly overcome influence of coma defect on broadband high-resolution spectrum analysis and measurement in application of the spectrograph. In particular, the integrated grating formed by combining a plurality of gratings, the bifocal tire optical focusing system and the two-dimensional area array detector are adopted, the light through hole is formed in the central position of the integrated grating, spectrum signals emitted from the incident slits may non-destructively pass and enter the collimating mirror, parallel spectrum signals after collimation enter the integrated grating along the coaxial optical path L1, and each sub spectrum signal, after diffraction of the corresponding sub-grating, is transmitted and focused through the coaxial optical path L2 by the bifocal tire mirror in the diffraction direction and enters the focal plane of the two-dimensional area array detector D. With the advantages of the combined grating, the coaxial incident optical path L1 and the coaxial incident optical path L2 are designed and have off-axis angles being 0. No any mechanical displacement part of an element is needed, no coma influence is generated, high-speed and high-resolution detection is carried out on full-spectrum data, and the measurement accuracy of the spectrum analyzer is remarkably improved.

BRIEF DESCRIPTION OF DRAWINGS

FIG. 1 is a schematic diagram of a light source incident or reflection line of a spectrograph in an embodiment of the present invention.

DETAILED DESCRIPTION OF EMBODIMENTS

The technical schemes of the present invention will be described in details below in conjunction with the accompanying drawings, while the protection scope of the present invention is not limited to the embodiments.

Embodiment: a coma-elimination broadband high-resolution spectrograph comprises incident slits, a collimating mirror, a color filter, an integrated grating, a two-dimensional focus imaging mirror and a two-dimensional area array detector The collimating mirror is a spherical mirror, the two-dimensional focus imaging mirror is a bifocal tire reflecting mirror, the color filter is used for filtering high-order diffraction light, the integrated grating consists of a plurality of sub-gratings, each sub-grating is disposed along a y direction perpendicular to an incident surface, each sub-grating has the same diffraction angle range along an x direction in which diffraction wavelengths are distributed in the incident plane, and a light through hole is formed in the center of the integrated grating.

Incident light enters along the incident slits, passes through the light through hole in the center of the integrated grating and is incident to the collimating mirror, the incident light enters the integrated grating along a coaxial optical path L1 after collimation of the collimating mirror and is focused by the two-dimensional focus imaging mirror after diffraction of each sub-grating of the integrated grating, diffraction light of a full-spectrum region enters a focal plane of the two-dimensional area array detector for detection along a coaxial optical path L2, and off-axis angles of the L1 and the L2 being zero In the embodiment, the widths of the incident slits are 10 micrometers, spectrum signals emitted from the incident slits may non-destructively pass a small hole h1 in the center of the integrated grating Gx and enters the collimating mirror M1 with a focal length being 250 nanometers, and parallel light is formed after reflection and enters the integrated grating Gx along the coaxial optical path L1. The integrated grating Gx consists of ten sub-gratings all being of structures of 1,200 g per millimeter, and spectrum regions of 200-10,000 nanometers are spectrum working regions and correspond to ten sub spectrum regions. A parameter of the blaze wavelength $\lambda_o$ with highest diffraction efficiency is selected, the spectrum region corresponding to each grating is 80 nanometers [$\lambda_o$=250 nm (200-280 nm), $\lambda_o$=300 nm (280-360 nm), $\lambda o$=400 nm (360-440 nm), $\lambda_o$=500 nm (440-680 nm), $\lambda_o$=750 nm (680-920 nm), $\lambda_o$=1000 nm (920-1000 nm)]. The color filter A is disposed between the collimating mirror M1 and the integrated grating Gx, has cutoff wavelength $\Delta_t$ being equal to 310 nm (360-520 nm), $\lambda_t$ being equal to 450 nm (520-680 nm) and $\lambda_t$ being equal to 620 nm (680-1,000 nm) and is capable of reliably filtering high-order diffraction light (m>=2).

The diffraction light emitted from the gratings enters the two-dimensional focus imaging mirror M2, the focal length f1 of the two-dimensional focus imaging mirror M2 along an L1 direction is 250 millimeters, the focal length f2 along an L2 direction is 500 nanometers, such that each sub spectrum region reflected the M2 is accurately imaged on the focal plane of the two-dimensional area array detector.

The two-dimensional area array detector D adopts a PIXIS-2048 two-dimensional CCD area array detector having a working wavelength being 200-1,000 nanometers and a 16 bits data dynamic range. The imaging area of the detector is 27.6 by 27.6 square millimeters, 2,048 by 2,048 pixels are included and correspond to ten gratings and ten sub spectrum regions, and the size of a single pixel is 0.0135 by 0.0135 square millimeter. The area of the focal plane of the two-dimensional area array detector in each sub detection region is 27.6 by 27.6 square millimeters, and 2,048 (in a diffraction direction) by 2,048 (in a direction perpendicular to diffraction) pixels are included. The wavelengths of the ten spectrum regions are connected in an end-to-end manner to form a complete continuous spectrum of a wavelength region of 200-1,000 nanometers. A one-dimensional detection region along the diffraction direction may reach a length of 276 millimeters and includes 20,480 pixels. A dispersive power of the spectrograph is 3.3 nanometers per millimeters, and the wavelength resolution is 0.045 nanometer per pixel.

In the embodiment, the focal plane of the two-dimensional area detector D is disposed above the integrated grating Gx and between the two-dimensional focus imaging mirror M2 and the two-dimensional area array detector D, and is the coaxial optical path L2 along the diffraction direction. With the design of the coaxial optical paths L1 and L2, the off-axis angles of the light entering the gratings and the diffraction light entering the detector both are zero, thereof, coma influence is completely overcome, and the resolution of the spectrograph is improved.

In conclusion, although the present invention has been expressed and described with reference to specific preferred embodiments, it shall not be interpreted as limitation of the present invention. Various changes may be made on forms and details of the present invention without departing from the spirit and scope, defined in the appending claims, of the present invention.

What is claimed is:

1. A coma-elimination broadband high-resolution spectrograph, characterized by comprising incident slits, a collimating minor, an integrated grating, a two-dimensional focus imaging mirror and a two-dimensional area array detector;
   the integrated grating consists of a plurality of sub-gratings, each sub-grating is disposed along a y direction perpendicular to an incident surface, each sub-grating has the same diffraction angle range in an x direction in which diffraction wavelengths are distributed, and a light through hole is formed in the center of the integrated grating; and
   incident light enters along the incident slits, passes through the light through hole in the center of the integrated grating and is incident to the collimating mirror, the incident light enters the integrated grating along a coaxial optical path L1 after collimation of the collimating mirror and is focused by the two-dimensional focus imaging mirror after diffraction of each sub-grating of the integrated grating, diffraction light of a full-spectrum region enters a focal plane of the two-dimensional area array detector for detection along a coaxial optical path L2, and off-axis angles of the L1 and the L2 are zero.

2. The coma-elimination broadband high-resolution spectrograph according to claim 1, characterized in that the total number of sub-gratings forming the integrated grating is n, n depends on $\lambda$ of total broadband spectrum regions and widths $\Delta\lambda_k$ of sub wavelength regions, n=$\lambda/\Delta\lambda$, and each sub-grating corresponds to one of the sub wavelength regions.

3. The coma-elimination broadband high-resolution spectrograph according to claim 2, characterized in that a diffraction angle of each sub-grating along an x direction in which diffraction wavelengths are distributed in an incident plane is $\Delta\theta$, $$\Delta\theta_1(\Delta\lambda_1)=\Delta\theta_2(\Delta\lambda_2)=\ldots=\Delta\theta_k(\Delta\theta_n) \quad (1)$$

In the formula:

$$\Delta\theta_1=\theta_2-\theta_1, \Delta\theta_2=\theta_3-\theta_2, \ldots \Delta\theta_k=\theta_{k+1}-\theta_k \quad (2)$$

$$\Delta\lambda_1=\lambda_2-\lambda_1, \Delta\lambda_2=\lambda_3-\lambda_2, \ldots \Delta\lambda_k=\lambda_{k+1}-\lambda_k \quad (3)$$

4. The coma-elimination broadband high-resolution spectrograph according to claim 1, characterized in that the collimating mirror is a spherical mirror.

5. The coma-elimination broadband high-resolution spectrograph according to claim 4, characterized in that the two-dimensional focus imaging mirror is a bifocal tire reflecting mirror or a coma-elimination bifocal lens, the focal length along an L1 direction is f1 and along an L2 direction is f2, and diffraction light from the integrated grating is focused on a focal plane of a two-dimensional area array detector, f1=250 nm, f2=500 nm.

6. The coma-elimination broadband high-resolution spectrograph according to claim 1, characterized in that a color filter is further disposed between the collimating mirror and the integrated grating and used for filtering high-order diffraction light.

* * * * *